US012537885B2

(12) United States Patent
Zhang et al.

(10) Patent No.: US 12,537,885 B2
(45) Date of Patent: Jan. 27, 2026

(54) EDGE REVERSAL TUNNEL PROXY FOR ISOLATED NETWORK

(71) Applicant: Lenovo Enterprise Solutions (Singapore) Pte. Ltd., New Tech Park (SG)

(72) Inventors: Caihong Zhang, Shanghai (CN); Ming Lei, Shanghai (CN); Jiang Chen, Shanghai (CN); Jeffery J Van Heuklon, Rochester, MN (US); Alexandru Cozma, Bucharest (RO)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 120 days.

(21) Appl. No.: 18/563,334

(22) PCT Filed: Jul. 12, 2023

(86) PCT No.: PCT/CN2023/107023
§ 371 (c)(1),
(2) Date: Nov. 21, 2023

(87) PCT Pub. No.: WO2025/010658
PCT Pub. Date: Jan. 16, 2025

(65) Prior Publication Data
US 2025/0227160 A1 Jul. 10, 2025

(51) Int. Cl.
*G06F 15/16* (2006.01)
*H04L 67/141* (2022.01)
*H04L 67/56* (2022.01)

(52) U.S. Cl.
CPC ............ *H04L 67/56* (2022.05); *H04L 67/141* (2013.01)

(58) Field of Classification Search
CPC .............................. H04L 67/56; H04L 67/141
See application file for complete search history.

(56) References Cited

U.S. PATENT DOCUMENTS 11,223,500 B2 * 1/2022 Damola ............... H04L 61/5007
2012/0331528 A1 * 12/2012 Fu ............................ H04L 67/10
726/4

(Continued)

FOREIGN PATENT DOCUMENTS

WO        2013134363 A1      9/2013

OTHER PUBLICATIONS

Ritter, "How to set up SSH dynamic port forwarding on Linux", Red Hat, date posted Jan. 25, 2021, date accessed Nov. 22, 2022, pp. 1-9.

(Continued)

*Primary Examiner* — Razu A Miah
(74) *Attorney, Agent, or Firm* — Kunzler Needham & Hilton; Bruce R. Needham

(57) ABSTRACT

A method for creating an edge server connected to a cloud server with a tunnel connection includes creating a tunnel connection between a port of an edge server and a port on a cloud server. The cloud server is unable to establish a communication link with the edge server independent of the tunnel connection. The method includes initiating a proxy on the edge server. The cloud server initiates a proxy on the cloud server after creation of the tunnel connection. Each proxy is configured to receive a message from a port and to transmit, over the tunnel connection, a modified message with a port number and the message. The port number is for a destination and each proxy is configured to receive a modified message over the tunnel connection and to transmit the message of the modified message to the port identified by the port number in the modified message.

17 Claims, 6 Drawing Sheets

(56) References Cited

U.S. PATENT DOCUMENTS

| | | | |
|---|---|---|---|
| 2014/0019653 A1* | 1/2014 | Amchislavsky | G09G 5/006 |
| | | | 710/106 |
| 2015/0271272 A1* | 9/2015 | Mahoney | H04L 67/141 |
| | | | 709/228 |
| 2015/0295890 A1* | 10/2015 | Qin | H04L 65/1066 |
| | | | 709/227 |
| 2016/0211989 A1* | 7/2016 | Jain | H04L 43/10 |
| 2017/0134239 A1* | 5/2017 | Mahoney | H04L 69/22 |
| 2018/0091323 A1* | 3/2018 | Haag | H04L 12/5691 |
| 2018/0124198 A1* | 5/2018 | Petrov | H04L 12/4633 |
| 2018/0152519 A1* | 5/2018 | Agarwal | H04L 63/02 |
| 2019/0104035 A1 | 4/2019 | Cidon et al. | |
| 2019/0342200 A1* | 11/2019 | Juneja | H04L 67/147 |
| 2020/0128067 A1* | 4/2020 | Guim Bernat | H04L 63/108 |
| 2020/0314212 A1 | 10/2020 | Branch et al. | |

OTHER PUBLICATIONS

"How to Set up SSH Tunneling (Port Forwarding)", Linuxize, date posted Nov. 5, 2020, date accessed Nov. 22, 2022, pp. 1-11.
BCCODE, "Multiple Reverse SSH Tunnels using Single Port", serverfault, date posted Jun. 20, 2014, date accessed Nov. 22, 2022, pp. 1-2.
PCT Application No. PCT/CN2023/107023 filed Jul. 12, 2023, International Search Report and Written Opinion of the International Searching Authority mailed Mar. 15, 2024.

\* cited by examiner

EDGE REVERSAL TUNNEL PROXY FOR ISOLATED NETWORK

FIELD

The subject matter disclosed herein relates to communication between a private server and a public server and more particularly relates to using a reverse tunnel connection and proxy to allow a public server to communication with a private server, such as an edge server.

BACKGROUND

In edge server deployment, different network conditions are often present, including edge nodes installed at an edge location where management software configured to manage the edge servers is located on a server in a public network, such as a public cloud server. The public cloud server typically is not able to initiate establishing a connection with any of the edge servers for safety concerns while an edge server is able to create a connection with the public cloud server. Often the edge servers or other private servers include network address translation ("NAT") to save public internet protocol ("IP") address usage. Often, an address of a baseboard management controller ("BMC") is hidden from the public cloud server.

BRIEF SUMMARY

A method for creating an edge server connected to a cloud server with a tunnel connection is disclosed. An apparatus and computer program product also perform the functions of the method. The method includes creating a tunnel connection between a port of an edge server and a port on a cloud server. The cloud server is unable to establish a communication link with the edge server independent of the tunnel connection. The method includes initiating a proxy on the edge server. The cloud server is configured to initiate a proxy on the cloud server in response to creation of the tunnel connection. Each proxy is configured to receive a message from a port and to transmit, over the tunnel connection, a modified message that includes a port number and the message. The port number is a destination port number and each proxy is configured to receive a modified message over the tunnel connection and to transmit the message contained in the modified message to the port identified by the port number in the modified message.

An apparatus for creating an edge server connected to a cloud server with a tunnel connection includes a tunnel module configured to create a tunnel connection between a port of the edge server and a port on the cloud server, where the cloud server is unable to establish a communication link with the edge server independent of the tunnel connection. The apparatus includes a proxy module configured to initiate a proxy on the edge server. The cloud server is configured to initiate a proxy on the cloud server in response to creation of the tunnel connection. Each proxy is configured to receive a message from a port and to transmit, over the tunnel connection, a modified message that includes a port number and the message. The port number is a destination port number and each proxy is configured to receive a modified message over the tunnel connection and to transmit the message contained in the modified message to the port identified by the port number in the modified message.

A program product for creating an edge server connected to a cloud server with a tunnel connection includes a non-transitory computer readable storage medium storing code. The code is configured to be executable by a processor to perform operations that include creating a tunnel connection between a port of the edge server and a port on the cloud server, where the cloud server is unable to establish a communication link with the edge server independent of the tunnel connection. The operations include initiating a proxy on the edge server. The cloud server is configured to initiate a proxy on the cloud server in response to creation of the tunnel connection. Each proxy is configured to receive a message from a port and to transmit, over the tunnel connection, a modified message that includes a port number and the message. The port number is a destination port number and each proxy is configured to receive a modified message over the tunnel connection and to transmit the message contained in the modified message to the port identified by the port number in the modified message.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
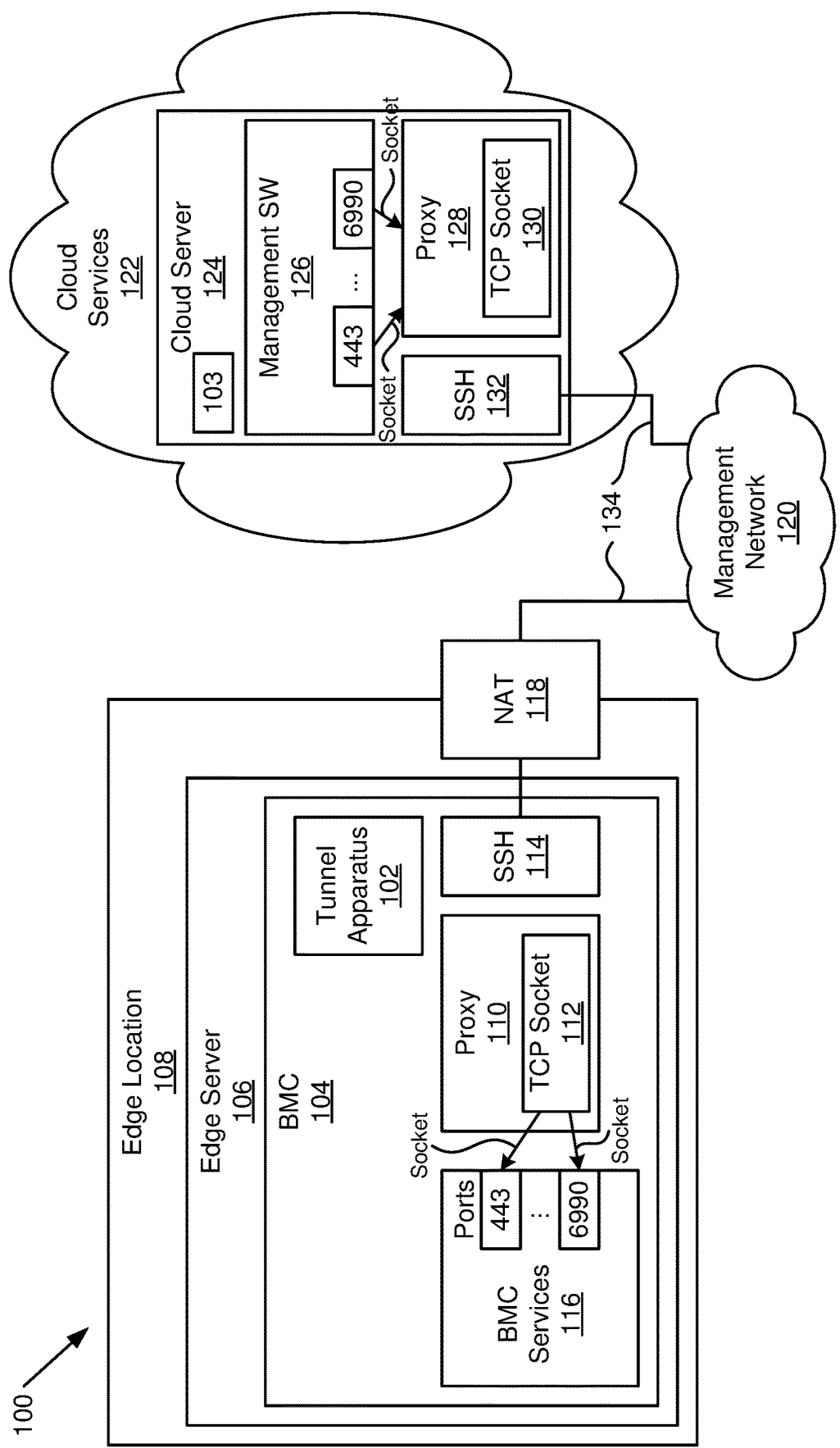
FIG. 1A is a schematic block diagram illustrating a system with an edge server connected to a cloud server with a tunnel connection and the edge server and cloud server each have a proxy, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C."

A method for creating an edge server connected to a cloud server with a tunnel connection is disclosed. An apparatus and computer program product also perform the functions of the method. The method includes creating a tunnel connection between a port of an edge server and a port on a cloud server. The cloud server is unable to establish a communication link with the edge server independent of the tunnel connection. The method includes initiating a proxy on the edge server. The cloud server is configured to initiate a proxy on the cloud server in response to creation of the tunnel connection. Each proxy is configured to receive a message from a port and to transmit, over the tunnel connection, a modified message that includes a port number and the message. The port number is a destination port number and each proxy is configured to receive a modified message over the tunnel connection and to transmit the message contained in the modified message to the port identified by the port number in the modified message.

In some embodiments, transmitting the message includes formatting a header of the message to include a destination port number to create a modified message. In the embodiments, receiving the modified message includes reading the port number in the header of the modified message.

In other embodiments, the tunnel connection includes a Secure Shell ("SSH") tunnel connection. The SSH tunnel connection communicates using transmission control protocol/internet protocol ("TCP/IP"). In other embodiments, each proxy includes a transmission control protocol ("TCP") socket. In other embodiments, the proxy in the edge server is in a baseboard management controller ("BMC") on the edge server and the proxy in the cloud server is in communication with a management software running on the cloud server. In other embodiments, the tunnel connection is created over a management network and the management software manages the edge server over the management network through the BMC.

In some embodiments, a location of the edge server includes a network address translation ("NAT") service configured to disable access to the edge server from the cloud server. In other embodiments, initiating the proxy on the cloud server includes configuring a previously deployed proxy on the cloud server to communicate over the tunnel connection and/or initiating the proxy on the edge server includes configuring a previously deployed proxy on the edge server to communicate over the tunnel connection. In other embodiments, the edge server is a first edge server of a plurality of edge servers at an edge location and creating the tunnel connection includes creating a respective tunnel connection between a port of each edge server of the plurality of edge servers and on the cloud server including the tunnel connection between the first edge server and the cloud server and initiating a proxy on each of the edge servers of the plurality of edge servers in addition to the proxy on the first edge server. A message directed to a particular edge server is received at the proxy on the cloud server and routed to the respective proxy on the edge server.

An apparatus for creating an edge server connected to a cloud server with a tunnel connection includes a tunnel module configured to create a tunnel connection between a port of the edge server and a port on the cloud server, where the cloud server is unable to establish a communication link with the edge server independent of the tunnel connection. The apparatus includes a proxy module configured to initiate a proxy on the edge server. The cloud server is configured to initiate a proxy on the cloud server in response to creation of the tunnel connection. Each proxy is configured to receive a message from a port and to transmit, over the tunnel connection, a modified message that includes a port number and the message. The port number is a destination port number and each proxy is configured to receive a modified message over the tunnel connection and to transmit the message contained in the modified message to the port identified by the port number in the modified message.

In some embodiments, transmitting the modified message includes formatting a header of the received message to include the destination port number to create the modified message, and receiving the modified message includes reading the port number in the header of the modified message.

In other embodiments, the tunnel connection includes a SSH tunnel connection, and the SSH tunnel connection communicates using TCP/IP. In other embodiments, each proxy includes a TCP socket. In other embodiments, the proxy in the edge server is in a BMC on the edge server and the proxy in the cloud server is in communication with a management software running on the cloud server. In other embodiments, the tunnel connection is created over a management network and the management software manages the edge server over the management network through the BMC.

In some embodiments, a location of the edge server includes a NAT service configured to disable access to the edge server from the cloud server. In other embodiments, the command to initiate the proxy on the cloud server includes configuring a previously deployed proxy on the cloud server to communicate over the tunnel connection and/or the proxy module initiating the proxy on the edge server includes configuring a previously deployed proxy on the edge server to communicate over the tunnel connection.

In other embodiments, the edge server is a first edge server of a plurality of edge servers at an edge location and each edge server of the plurality of edge servers includes a tunnel module configured to create a respective tunnel connection between a port of the edge server and on the cloud server, and a proxy module configured to initiate a proxy on each of the edge servers of the plurality of edge servers. A message directed to a particular edge server is received at the proxy on the cloud server and routed to the proxy on the particular edge server.

A program product for creating an edge server connected to a cloud server with a tunnel connection includes a non-transitory computer readable storage medium storing code. The code is configured to be executable by a processor to perform operations that include creating a tunnel connection between a port of the edge server and a port on the cloud server, where the cloud server is unable to establish a communication link with the edge server independent of the tunnel connection. The operations include initiating a proxy on the edge server. The cloud server is configured to initiate a proxy on the cloud server in response to creation of the tunnel connection. Each proxy is configured to receive a message from a port and to transmit, over the tunnel connection, a modified message that includes a port number and the message. The port number is a destination port number and each proxy is configured to receive a modified message over the tunnel connection and to transmit the message contained in the modified message to the port identified by the port number in the modified message.

In some embodiments, transmitting the modified message includes formatting a header of the received message to include the destination port number to create the modified message, and receiving the modified message includes reading the port number in the header of the modified message.

FIG. 1A is a schematic block diagram illustrating a system 100 with an edge server 106 connected to a cloud server 124 with a tunnel connection 134 and the edge server 106 and cloud server 124 each have a proxy 110, 128, according to various embodiments. The edge server 106, in some embodiments, includes a baseboard management controller ("BMC") 104 with a tunnel apparatus 102, which is explained below. The edge server 106 is at an edge location 108 different than the cloud server 124. Often, an edge location 108 is at a store, a data facility, a bank, a manufacturer, or other location different from a location of cloud services 122 and, as described herein, one or more edge servers 106 at the edge location 108 seek services of a cloud service 122. In some examples, the cloud services 122 provide computing capabilities for processing workloads. In other examples, the cloud services 122 provide management functions over a management network 120 to edge servers 106 at the edge location 108.

Typically, the edge location 108 includes network address translation ("NAT") 118 at a router that allows devices within the edge location 108 to have private network addresses different from internet protocol ("IP") or other addresses external to the edge location 108. NAT 118 provides a mechanism to preserve IP addresses as well as providing a firewall for network security. Where the edge location 108 includes NAT 118, in some embodiments, a cloud server 124 or other computing device external to the edge location 108 are unable to independently establish a communication pathway over the management network 120, which provides a level of security for the edge servers 106 and other devices at the edge location 108 that are able to connect to the management network 120.

While the system 100 of FIG. 1A depicts an edge location 108 with an edge server 106, the embodiments described herein are applicable to any server at any location with a connection to a public cloud server 124 over a management network 120 where the management network 120 includes an unsecured network and the cloud server 124 is unable to access the server directly. The unsecured network may include the Internet, a wide area network ("WAN"), a local area network ("LAN"), a cellular network, etc. and any combination thereof. In some embodiments, the management network 120 includes a wireless connection.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

Figure 1B:
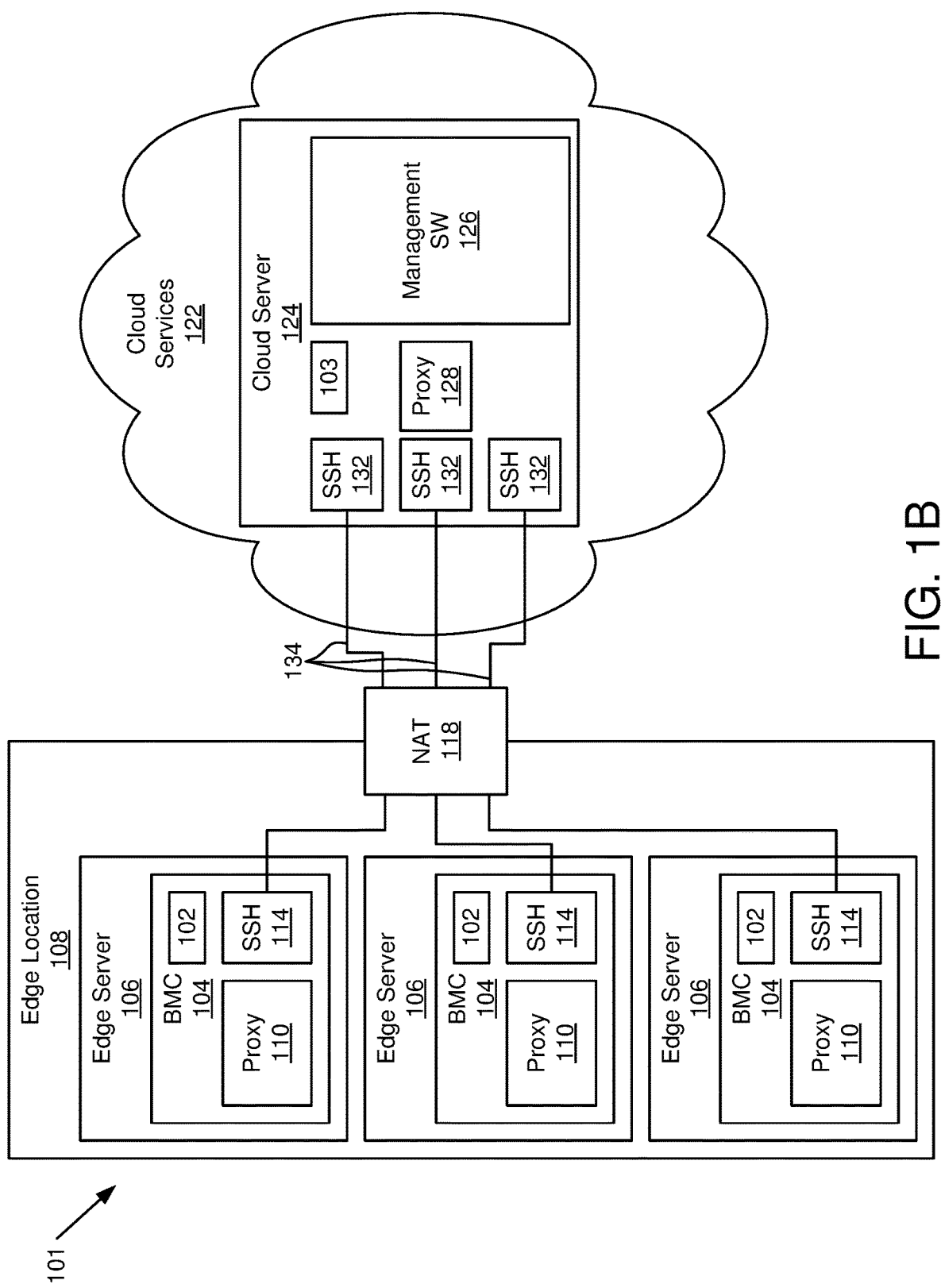
FIG. 1B is a schematic block diagram illustrating a system with multiple edge servers each connected to a cloud server with a tunnel connection and the edge servers and cloud server each have a proxy, according to various embodiments.

The edge location 108 in FIG. 1A includes a single edge server 106, but other edge locations 108 include additional edge servers 106, such as shown in FIG. 1B. Typically, an edge server 106 includes a BMC 104. A BMC 104 typically provides a mechanism to control the edge server 106 over the management network 120. One example of a BMC 104 is an Xclarity® Controller ("XCC") by Lenovo®. A BMC 104 provides a mechanism to download firmware, etc. A BMC 104 may also provide a way to start up the edge server 106 and provides a way to monitor physical parameters of the edge server 106, such as temperature, fan speed, central processing unit ("CPU") utilization, memory usage, etc. The BMC 104 typically runs various BMC services 116. The BMC services 116 are typically applications running on a processor of the BMC 104 and are typically intended to allow management of the edge server 106 though the BMC 104. In some examples, a BMC service 116 may include an application that receives and initiates a firmware update on the BMC 104. In other embodiments, the edge server 106 does not include a BMC 104 and the edge server 106 includes a proxy 110.

The cloud services 122 include one or more cloud servers 124. At least one cloud server 124 includes management software 126 for managing edge servers 106 via the BMC 104 in the edge servers 106. The management software 126 is typically a management server running on a cloud server 124. In some embodiments, the management software 126 is an XClarity® Administrator ("XCA") or an Xclarity® Orchestrator ("XCO"), both by Lenovo®. The cloud server 124, in some embodiments, includes a cloud apparatus 103 that is explained below.

Due to security, the cloud server 124 is typically unable to independently establish a connection with a BMC 104 of an edge server 106 over the management network 120. However, an edge server 106 is able to establish a connection with the cloud server 124 over the management network 120. One solution is for the edge server 106 to establish a tunnel connection 134 with the cloud server 124 where the tunnel connection uses a Secure Shell ("SSH") protocol. SSH is a cryptographic network protocol for operating network services securely over an unsecured network. In the system 100 of FIG. 1A, the tunnel connection 134 is depicted with an SSH 114 in the BMC 104 and an SSH 132 in the cloud server 124. SSH tunnel connection 134 and tunnel connection 134 are used interchangeably herein.

A limitation of an SSH tunnel connection 134, however, is that the SSH tunnel connection 134 is only able to communicate over one port on the edge server 106 and a corresponding single port on the cloud server 124. For example, an SSH tunnel connection 134 may connect to the edge server 106 and the cloud server 124 over port 443. Port 443 on the edge server 106 and the cloud server 124 are depicted as a rectangle with "443." Having a single SSH tunnel connection 134 connecting a single port on both servers 106, 124 is inconvenient because there is utility in being able to use additional ports for communication between the servers 106, 124. One existing solution is to establish an SSH tunnel connection 134 for each port to be used for communication between the servers 106, 124. However, having multiple SSH tunnel connections 134 between each edge server 106 and the cloud server 124 uses a lot of resources and is inconvenient.

The tunnel apparatus 102 in the BMC 104 (or in the edge server 106) and the cloud apparatus 103 in the cloud server 124 of the cloud server 124 provide a way to establish a single SSH tunnel connection 134 between an edge server 106 and the cloud server 124 and then to initiate a proxy 110 on the edge server 106 and a proxy on the cloud server 124. The tunnel apparatus 102 and the cloud apparatus 103 are described below with respect to FIG. 2. The proxies 110, 128 allow multiple ports of either server 106, 124 to send a message using the single SSH tunnel connection 134. For example, port 6990 of the management software 126 and/or cloud server 124 may send a message intended for the edge server 106 or BMC 104 of the edge server 106.

The proxy 128 of the cloud server 124 receives the message and adds a header to the message with the port number 6990 to create a modified message and then the proxy 128 of the cloud server 124 transmits the modified message over the SSH tunnel connection 134 to the proxy 110 of the BMC 104. The proxy 110 of the BMC 104 receives the modified message over the SSH tunnel connection 134, reads the header of the modified message to identify the port 6990 and then sends the message contained in the modified message to port 6990 of the BMC 104. The edge server 106 is able to send a message from a port other than 443 to the management software 126 of the cloud server 124 in a similar manner. While port 6990 is referenced in the example above, other ports of the cloud server 124 or edge server 106 may send a message to the proxy 110, 128.

Adding a proxy 110 to the edge server 106 and a proxy 128 to the cloud server 124, in some embodiments, provide a transmission control protocol ("TCP") socket (e.g., a TCP socket 112 in the proxy 110 of the BMC 104 and a TCP socket 130 in the cloud server 124), which provides secure TCP communications over the SSH tunnel connection 134. In some embodiments, the SSH tunnel connection 134 is called a reverse tunnel connection because the SSH tunnel connection 134 is created by the edge server 106 for use by the cloud server 124.

FIG. 1B is a schematic block diagram illustrating a system 101 with multiple edge servers 106 each connected to a cloud server 124 with a tunnel connection 134 and the edge servers 106 each have a proxy 110, according to various embodiments. In some embodiments, a single proxy 128 on the cloud server 124 manages the three tunnel connections 134 to the three edge servers 106. In other embodiments, each tunnel connection 134 is connected to a different proxy 128 in the cloud server 124 and each tunnel connection uses a separate port on the cloud server 124. The system 101 of FIG. 1B is substantially similar to the system 100 of FIG. 1A except for more edge servers 106. However, some components in the system 100 of FIG. 1A are not depicted in FIG. 1B for clarity. While three edge servers 106 are depicted, embodiments described herein are applicable to other systems with more or less edge servers 106. Note that each BMC 104 of an edge server 106 includes an SSH tunnel connection 134 to the cloud server 124.

To send a message, in some embodiments, the management software 126 would send the message to the proxy 128, which would determine a destination port number, would determine which edge server 106 would be the intended recipient of the message, would add the destination port number to a header of the message to create a modified message and would transmit the modified message to the proxy 110 of the BMC 104 of the edge server 106 intended to receive the message over the appropriate tunnel connection 134. The proxy 110 of the BMC 104 of the edge server 106 intended to receive the message then reads the port number from the header of the received modified message and sends the message contained in the modified message to the port of the BMC 104 of the edge server 106 that received the message.

Figure 2:
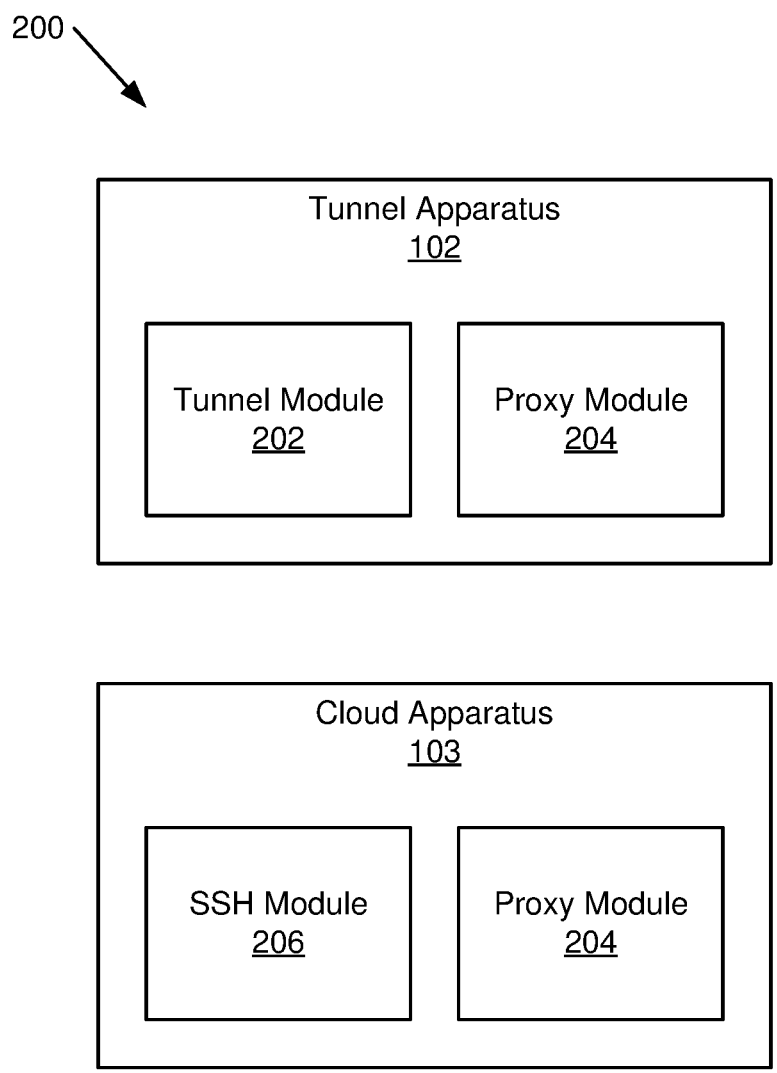
FIG. 2 is a schematic block diagram illustrating an apparatus for setting up a proxy and tunnel connection, according to various embodiments.

FIG. 2 is a schematic block diagram illustrating an apparatus 200 for setting up a proxy and tunnel connection, according to various embodiments. The apparatus 200 includes a tunnel apparatus 102 with a tunnel module 202 and a proxy module 204 and a cloud apparatus 103 with an SSH module 206 and a proxy module 204, which are described below. In some embodiments, the apparatus 200 is implemented with code stored on a non-transitory computer readable storage device of the BMC 104. In other embodiments, some or all of the apparatus 200 is implemented with hardware circuits and/or a programmable hardware device.

The apparatus 200 includes a tunnel module 202 configured to create a tunnel connection 134 between a port of an edge server 106 and a port on a cloud server 124. In some embodiments, the port on the cloud server 124 is the same port as the portion the edge server 106. In other embodiments, the port on the cloud server 124 is different than the port on the edge server 106. The cloud server 124 is unable to establish a communication link with the edge server 124 independent of the tunnel connection 134. In some examples, the edge server 106 includes a BMC 104, and for security reasons the BMC 104 is hidden behind a NAT 118, firewall, etc. The tunnel module 202, in some embodiments, creates an SSH tunnel connection and sets up the SSH 114 at the BMC 104 or at the edge server 106 where a BMC 104 is not present. The SSH module 206 in the cloud server 124 supports functions of the tunnel connection 134 at the cloud server 124 to use SSH protocol and sets up the SSH 132 at the cloud server 124. In some embodiments, setting up a SSH 114, 132 includes executing commands to configure the tunnel connection 134 to use SSH protocol.

In some embodiments, the SSH tunnel connection 134 communicates using TCP. The tunnel connection 134 allows a port (e.g., 443) on the cloud server 124 to send a message to the same port (e.g., 443) or a different port in the BMC 104 and/or edge server 106. Likewise, the BMC 104 in the edge server 106 is able to send a message from the port (e.g., 443) to a same port (e.g., 443) of the cloud server 124 or to a different port of the cloud server 124 (e.g., 444). Note that while port 443 is used in the example, another port of the BMC 104 and cloud server 124 can be used for the tunnel connection 134.

In some embodiments, a command for creating a tunnel connection is of the form: ssh-R 443:BMC_ip:443 user@mgmtsw_ip. In this particular command, 443 is the port number at the edge server 106 and the cloud server 124 used by the tunnel connection 134. The command uses BMC_ip as the identifier of the BMC 104. The identifier BMC_ip, in some embodiments, is for a BMC 104 that is an XCC and the identifier may be xcc_ip. Other BMCs 104 will include a different identifier. Other embodiments include a BMC by a different vendor and will have other identifiers. The –R option allows the remote host, e.g., the cloud server 124 to forward messages to the edge server 106, which may be called the "client host."

In embodiments with multiple edge servers 106, such as in the system 101 of FIG. 1B, the BMCs 104 each use a different port for the tunnel connection 134 but may use a same port on the cloud server 124. Here are three sample commands to set up three tunnel connections 134 from three edge servers 106 to a single port on a cloud server 124:

Edge server 1: "ssh-R 3001:BMC1_ip:3001 user@mgmtsw_ip"
Edge server 2: "ssh-R 3002:BMC2_ip:3001 user@mgmtsw_ip"
Edge server 3: "ssh-R 3003:BMC3_ip:3001 user@mgmtsw_ip"

The edge servers 106 all use port 3001 while the cloud server 124 uses port 3001 for the first edge server 106, port 3002 for the second edge server 106, and uses 3003 for the third edge server 106. After the three tunnel connections 134 are established, port 3001 on the cloud server 124 is mapped to port 3001 for the first edge server 106, port 3002 on the cloud server 124 is mapped to port 3001 for the second edge server 106, and port 3003 on the cloud server 124 is mapped to port 3001 for the third edge server 106. Note that the commands described above are possible embodiments while other embodiments include commands of a different format for different transmission protocols.

The apparatus 200 includes a proxy module 204 configured to initiate a proxy 110 on the edge server 106. In some embodiments, the cloud server 124 also includes a proxy module 204 that initiates a proxy 128 on the cloud server 124. In some embodiments, the proxy module 204 on the cloud server 124 initiates a proxy 128 on the cloud server 124 in response to creation of the tunnel connection 134. In other embodiments, the proxy module 204 on the edge server 106 is configured to send a command, message, etc. to the cloud server 124 to initiate a proxy 128 and the proxy module 204 on the cloud server 124 initiates the proxy 128 on the cloud server 124 in response to receiving the command, message, etc. from the edge server 106. In other embodiments, the proxy module 204 on the cloud server 124 initiates the proxy 128 on the cloud server 124 in response to a message, a command, an instruction, etc. from a source other than the edge server 106. Initiating a proxy 110, 128 on the edge server 106 and the cloud server 124 includes configuring, installing, creating, downloading, and/or other step known to those in the art so the proxy 110, 128 is operational.

In some embodiments, the proxy module 204 configures the proxy 110, 128 with the port number of the tunnel connection 134. For example, where the port number of the tunnel connection 134 is 3001 on the cloud server 124, the proxy module 204 on the cloud server 124 configures the proxy 128 on the cloud server 124 with port 3001 for all outgoing modified messages. The proxy module 204 on, for example, a second edge server 106 with a tunnel connection 134 from port 3002 configures the proxy 110 on the second edge server 106 with port 3002 for outgoing modified messages.

Each proxy 110, 128 is configured to receive a message from a port and to transmit a modified message that includes a port number and the message, where the port number is of a port sending the message and is configured to receive a modified message and transmit the message to the port identified by the port number in the modified message.

In some embodiments, receiving the message includes a proxy (e.g., 110 or 128) receiving the message from a port (e.g., 6990) on a server 106, 124 where the proxy is located. The server is the edge server 106 or the cloud server 124. For simplicity, this example will use port 6990 of the cloud server 124 but receiving a message can be from either proxy 110, 128. The proxy 128 formats a header of the message to include a port number (e.g., 6990) of the destination port 6990 to which the message is to be delivered to create a modified message and transmits the modified message over the tunnel connection 134. In some embodiments, each proxy 110, 128 formats the modified message as {Port number}:{Message body}.

The proxy 110 of the other server (e.g., edge server 106, typically in the BMC 104) receives the modified message over the tunnel connection 134 and reads the port number 6990 in the header of the modified message. The proxy 110 then transmits the message contained in the modified message to the port 6990 identified by the port number 6990 in the header. The port is on the edge server 106 or the cloud server 124 where the proxy 110, 128 receiving the modified message is located. In some embodiments, the proxy 110 strips the port number from the modified message before transmitting the message to the port of the edge server 106 (or BMC 104 of the edge server 106). In the example above, the proxy 110 of the edge server 106 receives the modified message over the tunnel connection 134. The example above functions similarly for a message being sent from a port of the edge server 106. While port 6990 is used in this example, any port of the cloud server 124 or edge server 106 is able to send a message to the proxy 110, 128.

In some embodiments, the command from the proxy module 204 sent to the cloud server 124 includes code to initiate the proxy 128 on the cloud server 124. In other embodiments, the command includes a link to code to initiate the proxy 128 on the cloud server 124. One of skill in the art will recognize other ways for the command sent to the cloud server 124 to initiate a proxy 128 on the cloud server 124.

In some embodiments, the proxy 128 in the cloud server 124 sets up a TCP connection to the edge server 106 with a TCP socket 112 in the proxy 110 of the edge server 106 and a TCP socket 130 in the proxy 128 of the cloud server 124. A TCP socket 112, 130 is a connection-oriented socket that uses TCP. Where there are multiple tunnel connections 134, the proxy 128 in the cloud server 124 sets up a TCP socket 112, 130 for each tunnel connection 134. Typically, a TCP socket is defined by an IP address of the machine where the connection is established and the port the connection uses. In some embodiments, the TCP sockets 112, 130 guarantee that all data is received and acknowledged, or an error is generated.

In some embodiments, the edge server 106 does not include a BMC 104 and the proxy module 204 initiates the proxy 110 on the edge server 106. In other embodiments, the edge server 106 includes a BMC 104 and the proxy module 204 initiates the proxy 110 in the BMC 104. In some embodiments, initiating the proxy 128 on the cloud server 124 includes configuring a previously deployed proxy on the cloud server 124 to communicate over the tunnel connection 134. Likewise, in some embodiments, initiating the proxy 110 on the edge server 106 (or BMC 104) includes configuring a previously deployed proxy on the edge server 106 (or BMC 104) to communicate over the tunnel connection 134.

Figure 3:
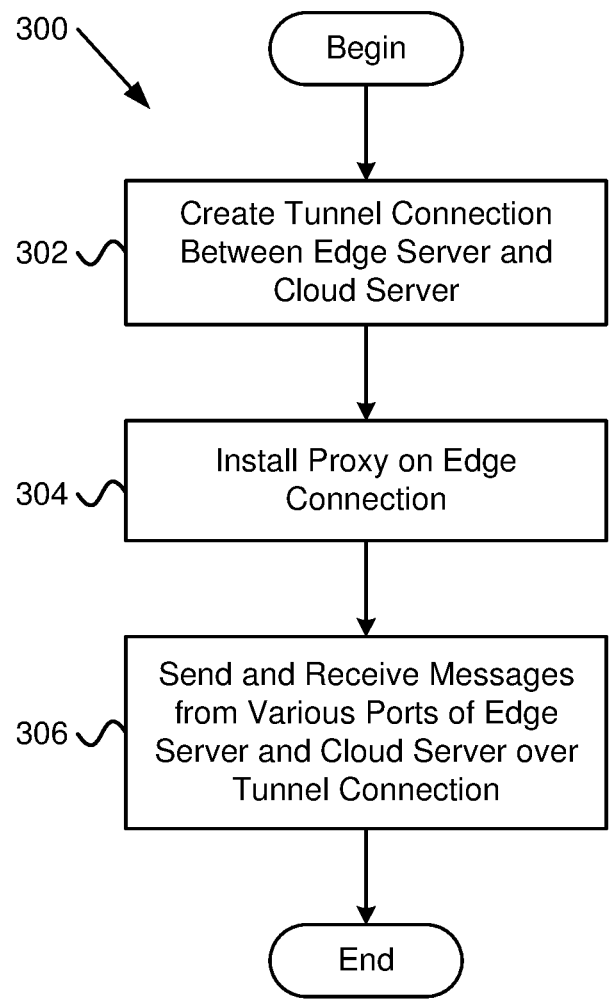
FIG. 3 is a schematic flow chart diagram illustrating a method for connecting an edge server to a cloud server, according to various embodiments.

FIG. 3 is a schematic flow chart diagram illustrating a method 300 for connecting an edge server 106 to a cloud server 124, according to various embodiments. The method 300 begins and creates 302 a tunnel connection 134 between a port of an edge server 106 and a port on a cloud server 124. The cloud server 124 is unable to establish a communication link with the edge server 106 independent of the tunnel connection 134. In some examples, the edge server 106 or ports of the edge server 106 are hidden from the cloud server 124. In some embodiments, the port of the edge server 106 is in a BMC 104 of the edge server 106.

The method 300 initiates 304 a proxy 110 on the edge server 106. The cloud server 124 also initiates a proxy 128. In some embodiments, the cloud server 124 initiates the proxy 128 on the cloud server 124 in response to the method 300 creating 302 of the tunnel connection 134. In other embodiments, the cloud server 124 initiates the proxy 128 on the cloud server 124 in response to a command, message, instruction, etc. from the edge server 106. Each proxy 110, 128 is configured to transmit and receive a modified message with a destination port number in a header of the message where the port number is a destination port number where the message is intended to be delivered. The method 300 sends 306 and receives 306 messages from various ports of the edge server 106 and the cloud server 124 over the tunnel connection 134, and the method 300 ends. In various embodiments, all or a portion of the method 300 is implemented using the tunnel module 202 and/or the proxy module 204.

Figure 4:
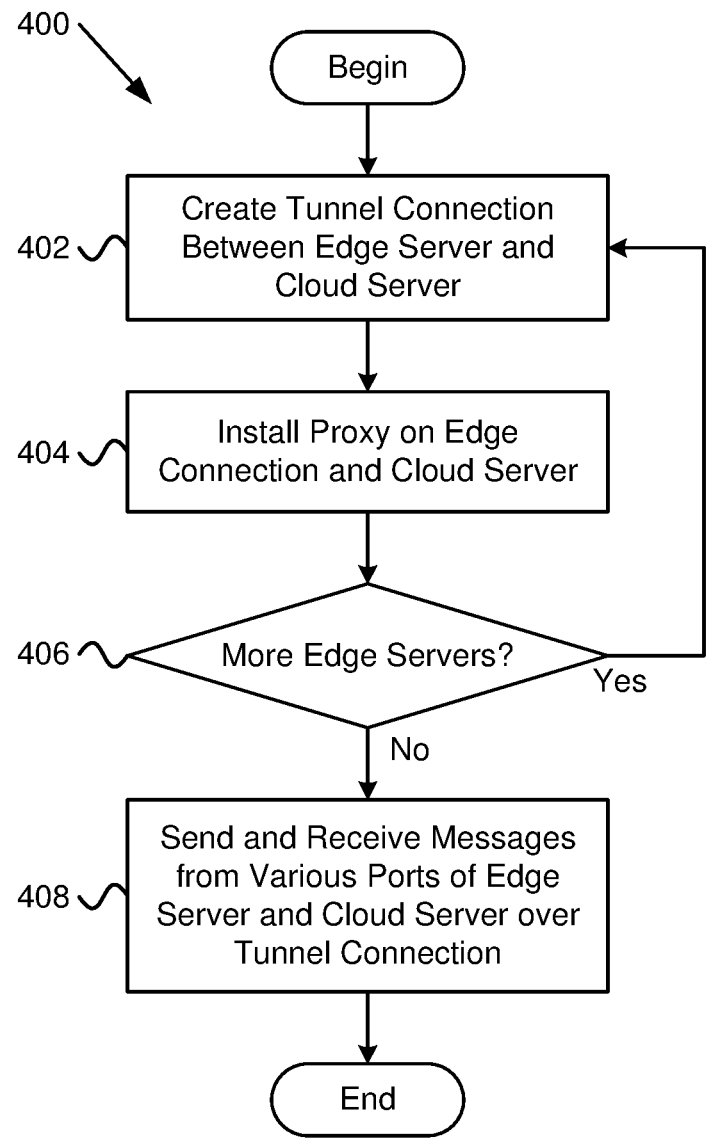
FIG. 4 is a schematic flow chart diagram illustrating another method for connecting edge servers to a cloud server, according to various embodiments.

FIG. 4 is a schematic flow chart diagram illustrating another method 400 for connecting edge servers 106 to a cloud server 124, according to various embodiments. The method 400 begins and creates 402 a tunnel connection 134 between a port of an edge server 106 and a port on a cloud server 124. The cloud server 124 is unable to establish a communication link with the edge server 106 independent of the tunnel connection 134. In some examples, the edge server 106 or ports of the edge server 106 are hidden from the cloud server 124. In some embodiments, the port of the edge server 106 is in a BMC 104 of the edge server 106. The method 400 initiates 404 a proxy 110 on the edge server 106. In some embodiments, the cloud server 124 initiates the proxy 128 on the cloud server 124 in response to the method 400 creating 402 of the tunnel connection 134. In other embodiments, the cloud server 124 initiates the proxy 128 on the cloud server 124 in response to a command, message, instruction, etc. from the edge server 106. Each proxy 110, 128 is configured to transmit and receive a modified message with a port number in a header of the message of a port sending the message.

The method 400 determines 406 if there are more edge servers 106 where a tunnel connection 134 and/or a proxy 110 have not been initiated. If the method 400 determines 406 that there are more edge servers 106, the method 400 returns and creates 402 a new tunnel connection between the next edge server 106 and the cloud server 124 and initiates 404 a proxy on this next edge server 106. If the method 400 determines 406 that there are not any additional edge servers 106 with a tunnel connection 134 and proxy 110, the method 400 sends 408 and receives 408 messages from various ports of the edge servers 106 and the cloud server 124 over the tunnel connections 134, and the method 400 ends. In various embodiments, all or a portion of the method 400 is implemented using the tunnel module 202 and/or the proxy module 204.

Figure 5:
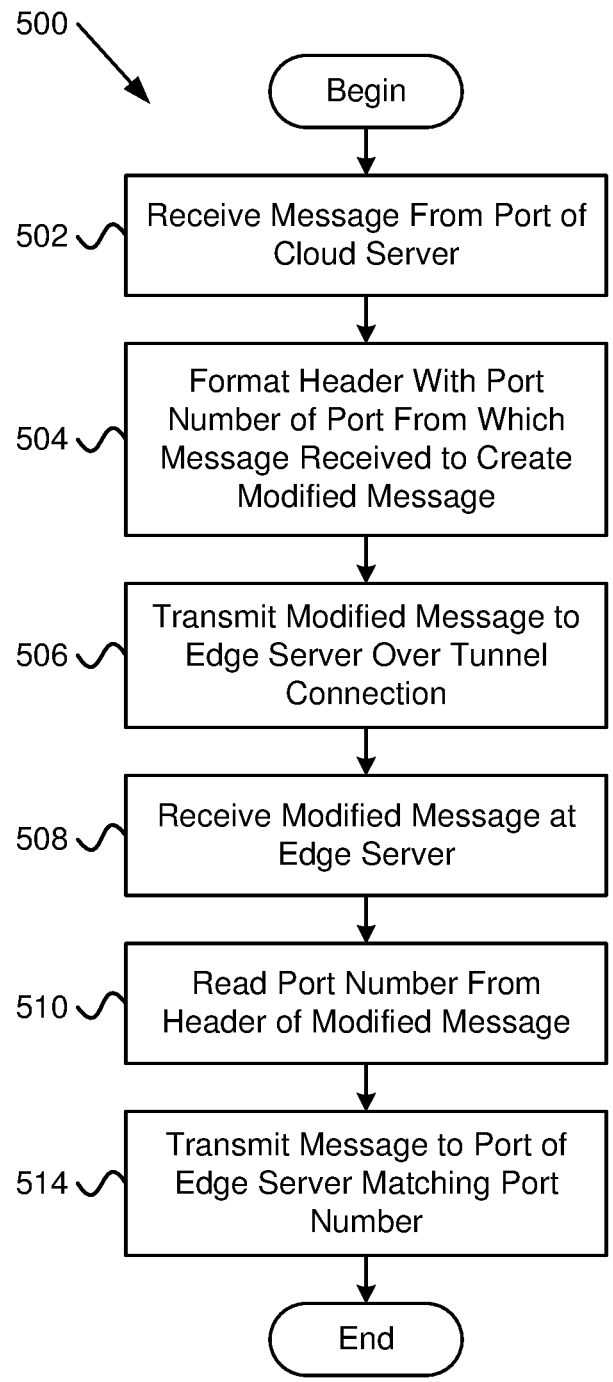
FIG. 5 is a schematic flow chart diagram illustrating method of communication between an edge server and a cloud server where the edge server and the cloud server are connected with a tunnel connection and the servers include a proxy, according to various embodiments.

FIG. 5 is a schematic flow chart diagram illustrating method 500 of communication between an edge server 106 and a cloud server 124 where the edge server 106 and the cloud server 124 are connected with a tunnel connection 134 and the servers 106, 124 include a proxy 110, 128, according to various embodiments. The method 500 is based on a message originating at the cloud server 124. Messages originating at the edge server 106 follow a similar method. The method 500 begins and receives 502 a message from a port of the cloud server 124 and formats 504 a header of the message with the destination port number of the port to which the message is to be delivered to create a modified message. The method 500 transmits 506 the modified message to the edge server 106 (or BMC 104 of the edge server 106) over the tunnel connection 134.

The method 500 receives 508, at the proxy 110 of the edge server 106, the modified message and reads 510 the port number from the header of the modified message. The method 500 transmits 514 the message contained in the modified message to the port of the edge server 106 (or port of the BMC 104 of the edge server 106) that matches the port number of the modified message, and the method 500 ends. In some embodiments, the method 500 strips the port number from the header of the modified message before transmitting the message to the port. In various embodiments, all or a portion of the method 500 is implemented with the proxies 110, 128 and tunnel connection 134.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    creating a tunnel connection between a port of an edge server and a port on a cloud server, wherein the cloud server is unable to establish a communication link with the edge server independent of the tunnel connection; and
    initiating a proxy on the edge server, wherein the cloud server is configured to initiate a proxy on the cloud server in response to creation of the tunnel connection and wherein each proxy is configured to receive a message from a port and to transmit, over the tunnel connection, a modified message that includes a port number and the message, wherein the port number is a destination port number and wherein each proxy is configured to receive a modified message over the tunnel connection and to transmit the message contained in the modified message to the port identified by the port number in the modified message,
    wherein transmitting the modified message comprises formatting a header of the received message to include the destination port number to create the modified message, and wherein receiving the modified message comprises reading the port number in the header of the modified message.

2. The method of claim 1, wherein the tunnel connection comprises a Secure Shell ("SSH") tunnel connection, wherein the SSH tunnel connection communicates using transmission control protocol/internet protocol ("TCP/IP").

3. The method of claim 1, wherein each proxy comprises a transmission control protocol ("TCP") socket.

4. The method of claim 1, wherein the proxy in the edge server is in a baseboard management controller ("BMC") on the edge server and the proxy in the cloud server is in communication with a management software running on the cloud server.

5. The method of claim 4, wherein the tunnel connection is created over a management network and wherein the management software manages the edge server over the management network through the BMC.

6. The method of claim 1, wherein a location of the edge server comprises a network address translation ("NAT") service configured to disable access to the edge server from the cloud server.

7. The method of claim 1, wherein initiating the proxy on the cloud server comprises configuring a previously deployed proxy on the cloud server to communicate over the tunnel connection and/or wherein initiating the proxy on the edge server comprises configuring a previously deployed proxy on the edge server to communicate over the tunnel connection.

8. The method of claim 1, wherein the edge server is a first edge server of a plurality of edge servers at an edge location and wherein creating the tunnel connection comprises:
    creating a respective tunnel connection between a port of each edge server of the plurality of edge servers and the cloud server including the tunnel connection between the first edge server and the cloud server; and
    initiating a proxy on each of the edge servers of the plurality of edge servers in addition to the proxy on the first edge server, wherein a message directed to a particular edge server is received at the proxy on the cloud server and routed to the respective proxy on the edge server.

9. An apparatus comprising:
    a tunnel module configured to create a tunnel connection between a port of an edge server and a port on a cloud server, wherein the cloud server is unable to establish a communication link with the edge server independent of the tunnel connection; and
    a proxy module configured to initiate a proxy on the edge server, wherein the cloud server is configured to initiate a proxy on the cloud server in response to creation of the tunnel connection and wherein each proxy is configured to receive a message from a port and to transmit, over the tunnel connection, a modified message that includes a port number and the message, wherein the port number is a destination port number and wherein each proxy is configured to receive a modified message over the tunnel connection and to transmit the message contained in the modified message to the port identified by the port number in the modified message,
    wherein transmitting the modified message comprises formatting a header of the received message to include the destination port number to create the modified message, and wherein receiving the modified message comprises reading the port number in the header of the modified message.

10. The apparatus of claim 9, wherein the tunnel connection comprises a Secure Shell ("SSH") tunnel connection, wherein the SSH tunnel connection communicates using transmission control protocol/internet protocol ("TCP/IP").

11. The apparatus of claim 9, wherein each proxy comprises a transmission control protocol ("TCP") socket.

12. The apparatus of claim 10, wherein the proxy in the edge server is in a baseboard management controller ("BMC") on the edge server and the proxy in the cloud server is in communication with a management software running on the cloud server.

13. The apparatus of claim 12, wherein the tunnel connection is created over a management network and wherein the management software manages the edge server over the management network through the BMC.

14. The apparatus of claim 9, wherein a location of the edge server comprises a network address translation ("NAT") service configured to disable access to the edge server from the cloud server.

15. The apparatus of claim 9, wherein one of:
    initiating the proxy on the cloud server comprises configuring a previously deployed proxy on the cloud server to communicate over the tunnel connection;
    the proxy module initiating the proxy on the edge server comprises configuring a previously deployed proxy on the edge server to communicate over the tunnel connection; and
    initiating the proxy on the cloud server comprises configuring a previously deployed proxy on the cloud server to communicate over the tunnel connection and wherein the proxy module initiating the proxy on the edge server comprises configuring a previously deployed proxy on the edge server to communicate over the tunnel connection.

16. The apparatus of claim 9, wherein the edge server is a first edge server of a plurality of edge servers at an edge location, wherein each edge server of the plurality of edge servers comprises:
- a tunnel module configured to create a respective tunnel connection between a port of the edge server and the cloud server; and
- a proxy module configured to initiate a proxy on each of the edge servers of the plurality of edge servers, wherein a message directed to a particular edge server is received at the proxy on the cloud server and routed to the proxy on the particular edge server.

17. A program product comprising a non-transitory computer readable storage medium storing code, the code being configured to be executable by a processor to perform operations comprising:
- creating a tunnel connection between a port of an edge server and a port on a cloud server, wherein the cloud server is unable to establish a communication link with the edge server independent of the tunnel connection; and
- initiating a proxy on the edge server, wherein the cloud server is configured to initiate a proxy on the cloud server in response to creation of the tunnel connection and wherein each proxy is configured to receive a message from a port and to transmit, over the tunnel connection, a modified message that includes a port number and the message, wherein the port number is a destination port number and wherein each proxy is configured to receive a modified message over the tunnel connection and to transmit the message contained in the modified message to the port identified by the port number in the modified message,
- wherein transmitting the modified message comprises formatting a header of the received message to include the destination port number to create the modified message, and wherein receiving the modified message comprises reading the port number in the header of the modified message.

\* \* \* \* \*